J. C. MOON.
PIPE ASSEMBLING MACHINE.
APPLICATION FILED MAY 18, 1916.
1,232,707.
Patented July 10, 1917.
3 SHEETS—SHEET 1.
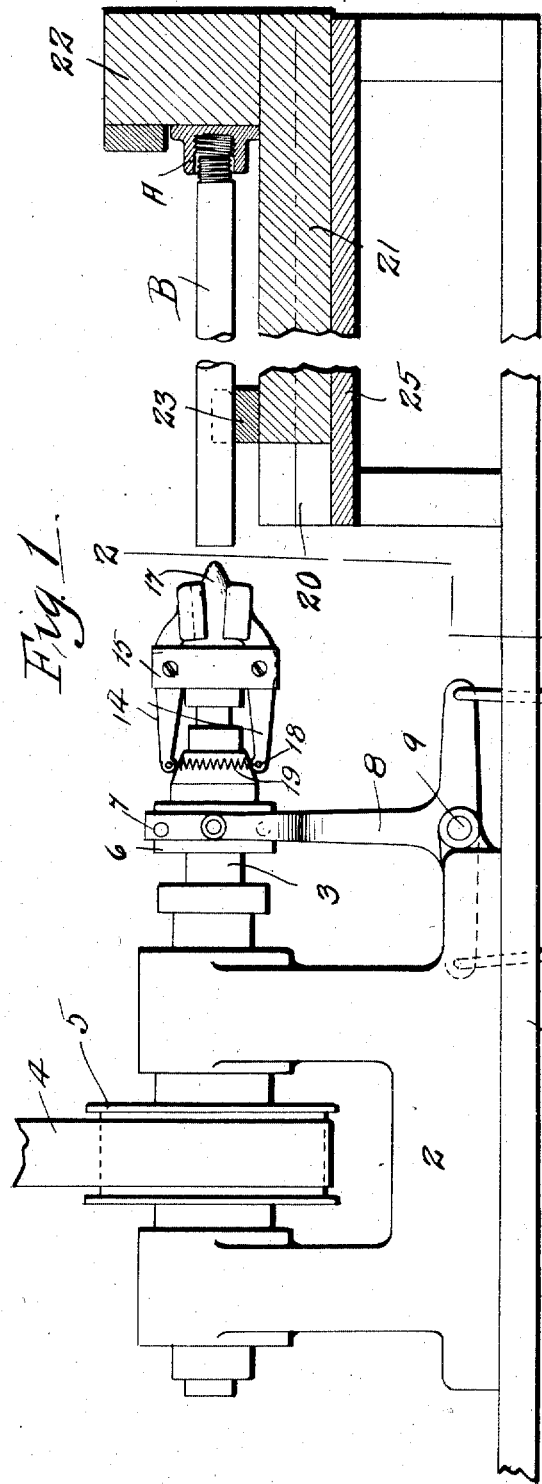
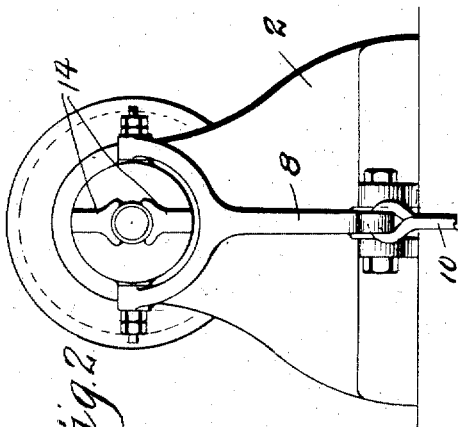
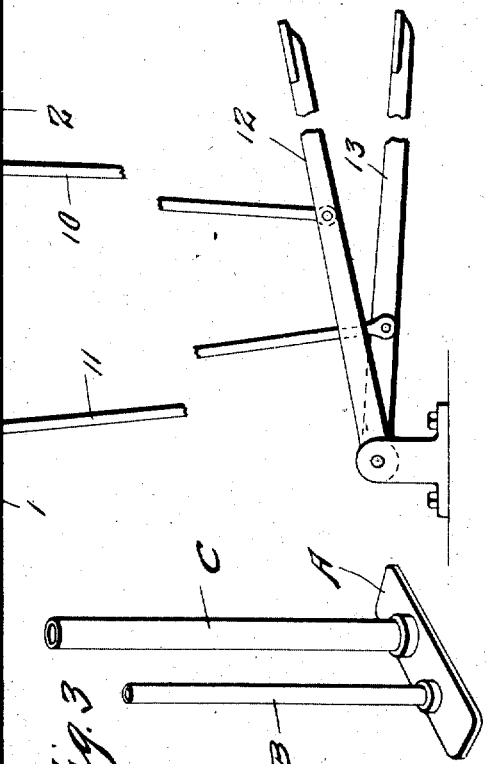
Inventor
John C. Moon
By [signature], atty.

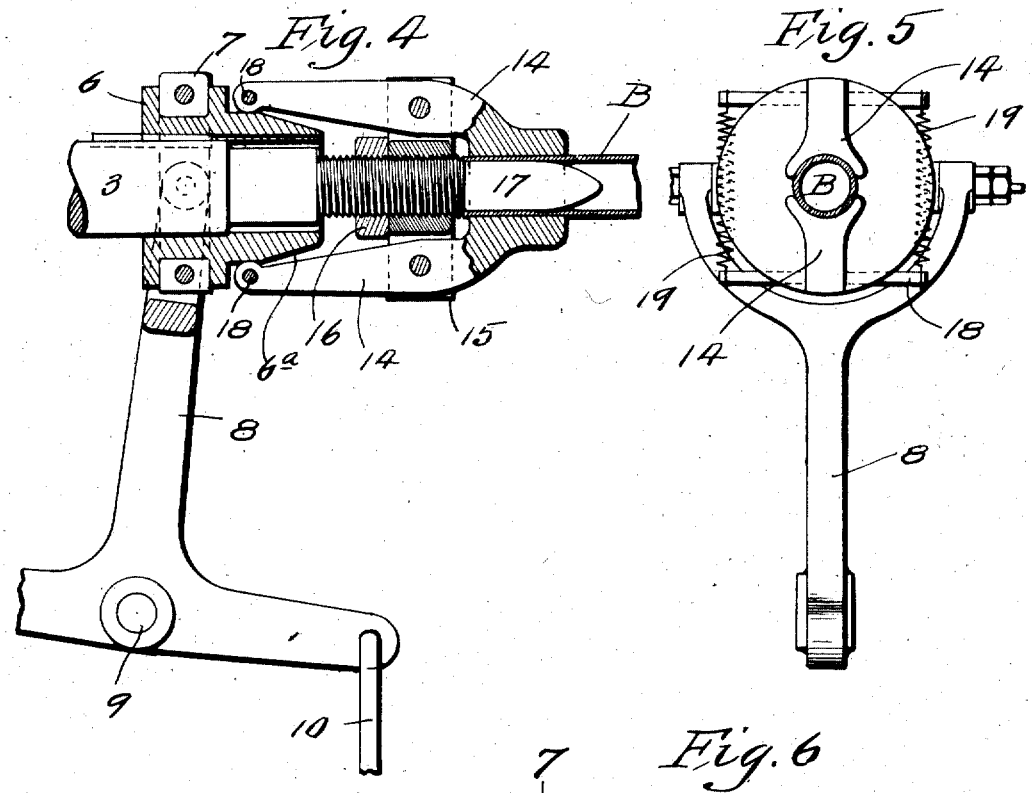
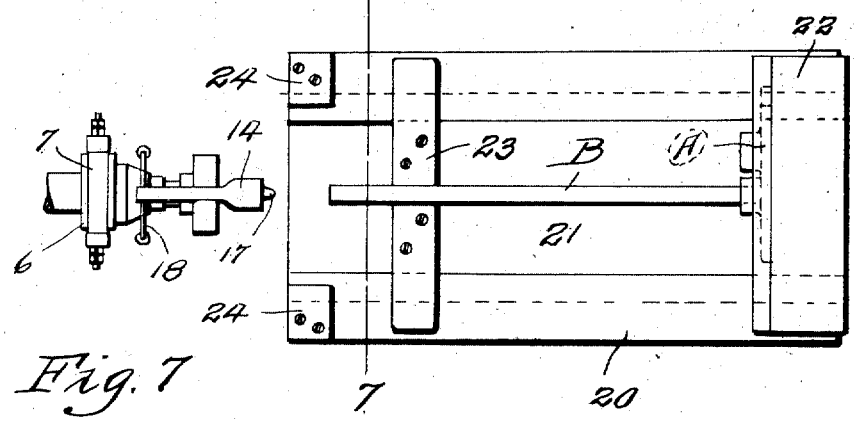
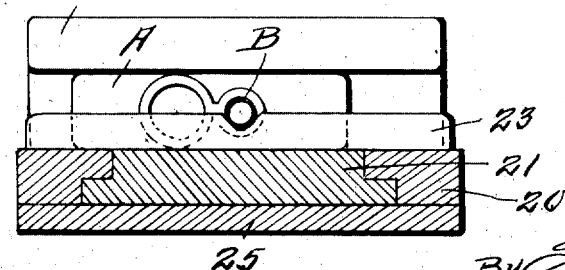

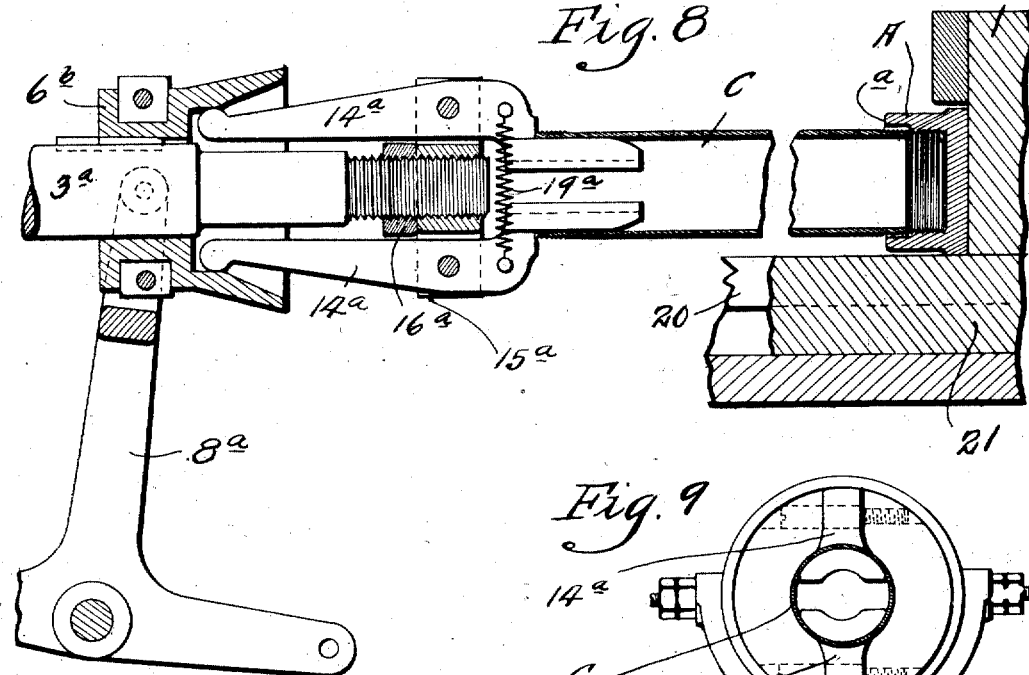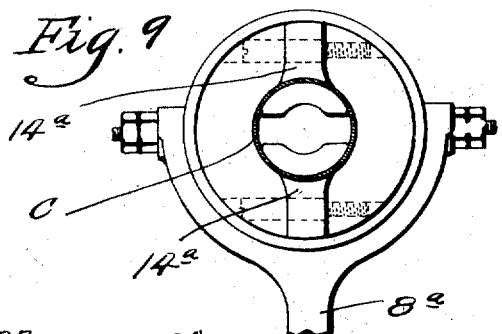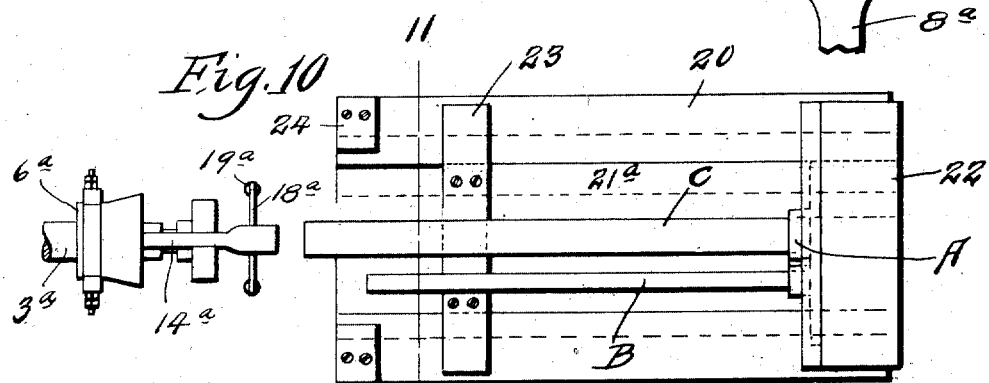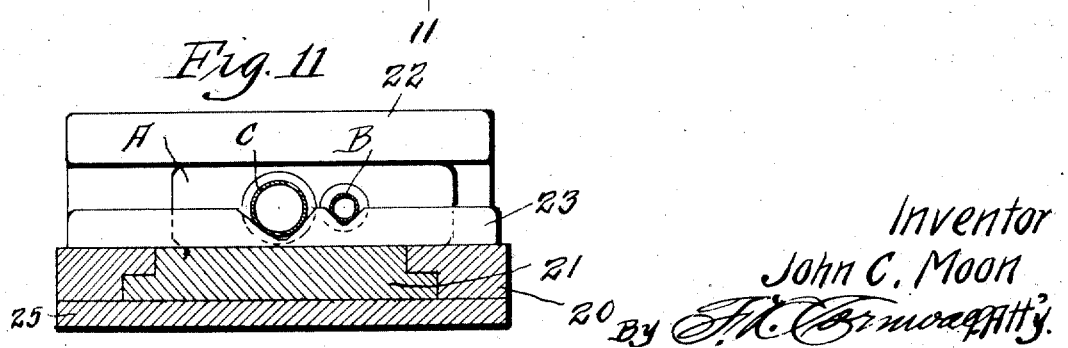

UNITED STATES PATENT OFFICE.

JOHN C. MOON, OF ST. LOUIS, MISSOURI.

PIPE-ASSEMBLING MACHINE.

1,232,707.      Specification of Letters Patent.      Patented July 10, 1917.

Application filed May 18, 1916. Serial No. 98,322.

*To all whom it may concern:*

Be it known that I, JOHN C. MOON, a citizen of the United States, residing at the city of St. Louis, State of Missouri, have invented a certain new and useful Improvement in Pipe-Assembling Machines, of which the following is a full, clear, and exact description, such as will enable others skilled in the art to which it appertains to make and use the same, reference being had to the accompanying drawings, forming part of this specification, in which—

Figure 1 is a side elevational view of my improved pipe assembling machine.

Fig. 2 is a sectional view on line 2—2 of Fig. 1.

Fig. 3 is a detail view of the pipes in their assembled relation.

Fig. 4 is a longitudinal sectional view through one form of assembling chuck.

Fig. 5 is an end elevational view of the assembling chuck shown in Fig. 4.

Fig. 6 is a plan view of the feed table.

Fig. 7 is a sectional view on line 7—7 of Fig. 6.

Fig. 8 is a longitudinal sectional view through another form of chuck.

Fig. 9 is an end elevational view of the form of chuck shown in Fig. 8.

Fig. 10 is a plan view of the feed table for use in connection with the chuck shown in Fig. 8.

Fig. 11 is a sectional view on line 11—11 of Fig. 10.

This invention relates to a new and useful improvement in pipe assembling machines, the object being to construct a machine which is simple and cheap and one which is easily and quickly operated.

The machine shown in the accompanying drawings is designed especially for use in assembling pipes constituting the cylinders of a pneumatic pump, into a suitable base, the parts so assembled being shown in Fig. 3, but it is obvious that the principles of the present invention may be employed in assembling other structures, whether they be pipes or rods. The pump base and cylinders shown in Fig. 3, as illustrating the parts to be assembled by the present apparatus, consist of a base casting A, having suitable bosses extending upon its upper side into which are threaded a relatively small and short pipe B, and a relatively large and longer pipe C. Of course these pipes can be screwed into the base by hand when the threads formed on the respective parts properly engage, but this hand operation is not only tedious, but unsatisfactory, in that it is costly. To seat the pipes properly in the base in hand-assembling, the pipe is clamped in a vise and then the base screwed on. Sometimes it is difficult to "find" a thread and in consequence the bosses on the base are reamed out as shown at *a* in Figs. 1 and 8 so as to provide a smooth, unthreaded entering mouth for the threaded end of the pipe, the threads in the boss being cut near the bottom thereof. The present invention is not concerned with the threading of the pipes or the reaming of the bosses as these operations are presumed to have been performed before the parts are in readiness for assemblage. The parts so formed are placed within convenient reach of the operators, preferably two machines, one for the smaller pipe and one for the larger pipe, being arranged side by side, one operator, after assembling the small pipe on the base, passing such assembled parts to the next operator for the purpose of enabling him to assemble the large pipe on the base.

In the drawings, 1 indicates a bench or table on which is mounted a casting 2 forming bearings in which is mounted a shaft 3 driven by means of a belt 4 passing around a pulley 5 on said shaft. Mounted to slide lengthwise upon and rotate with shaft 3 is a collar 6 in which is formed a peripheral groove and loosely mounted therein is a ring 7, the same serving as a gimbal bearing for said collar. (See Fig. 4). This ring 7 is pivotally connected to the bifurcated end of a lever 8, the same being pivoted at 9 to the casting 2 and the opposite ends of the lower portion of said lever are connected to rods 10 and 11 which in turn are connected to foot levers 12 and 13.

When lever 12 is depressed the collar 6 will be moved outwardly on shaft 3; and when lever 13 is depressed, collar 6 will be moved inwardly on said shaft. The outer end of collar 6 is formed with a cone-shaped face 6ª with which coöperate the inner ends of clamping-levers 14, said levers being pivoted in a support 15 threaded on shaft 3 and locked in position thereupon by a jam nut 16.

17 is a centering pin, preferably pointed at its outer end, forming a continuation of shaft 3 and whose external diameter is such as to fit within the pipe B. The outer ends of levers 14 are provided with curved clamping jaws (see Fig. 5) which are designed to grip the end of pipe B when foot-lever 12 is depressed.

The inner ends of the clamping jaws 14 are preferably provided with rods 18 connected by retractile springs 19 whereby when the collar 6 is slid inwardly on shaft 3, the clamping jaws of levers 14 will open so as to release the pipe.

The construction above described is such that the gripping action of the clamping jaws 14 is sufficient to rotate the pipe B. and thread the same into its boss in the base A.; but, when pipe B. is seated home in the base casting, the jaws 14 being unable to further rotate, said pipe will slip thereupon (said pipe remaining stationary) and the operator, by pressing lever 13, may release the pipe and withdraw it from the centering pin 17.

The means for supporting the base casting A. and the pipe B. for purposes of assemblage consists of two guiding members 20 supported a suitable distance above the table or bench 1 between which guiding members slidingly operates a bed plate 21 having a head portion 22 at its outer end formed with a groove or seat in its inner face to receive the base casting A. (see Fig. 7), said bed plate also carrying a bar 23 which preferably extends beyond the guiding members 20 so as to coöperate with stop-blocks 24 projecting upwardly from the inner ends of said guiding members. The guiding members 20 may be connected together by a plate member 25 (see Fig. 7). The bar 23 has a V-shaped groove in its upper face to receive and support the pipe B. The operator, after placing the base A. in its seat in the head 22, next arranges the pipe B. in its boss, or rather in the smooth-surfaced mouth portion of said boss, the inner end of pipe B. being received in and supported by the groove in the upper face of the cross bar 23. The operator now, by pushing inwardly on the head 22, slides it, the bed plate 21, and the cross bar 23, inwardly until the end of pipe B. is located over the centering pin 17 and against the shoulder at the base of said centering pin. The operator now depresses lever 12 so as to clamp the pipe B. and cause it to rotate with the shaft 3, the operator, after this clamping operation, continuing to exert inward pressure against the pipe so that the threads thereon will catch the threads on the base. Once caught, the pipe B. will practically feed itself into the boss on the base until it is seated home, when said pipe will cease rotating and clamping jaws 14 will rotate around the pipe. The operator may, by lightly holding his hand on the pipe, determine this or may depend upon his sense of sight.

When the pipes B. have been assembled on the base castings, they may be passed to another operator near by who has been supplied with a quantity of pipes C; or the chuck for clamping the pipe B., just described, may be removed and the chuck for the larger pipe substituted. I prefer, however, to employ a second operator and a separate machine for assembling the larger pipes on the base.

Referring now to Figs. 8 to 11, it will be observed that in the second machine, the shaft 3ª is provided with a sliding collar 6ᵇ whose inward and outward positions on the shaft are controlled by the lever 8ª connected to foot levers, not shown, in the manner heretofore described with respect to levers 12 and 13. The collar 6ᵇ in the present instance, has an outwardly flaring flange forming an annular cam face for coöperating with jaws 14ª pivoted to a block 15ª screwed on the shaft 3ª and held in position by a jam nut 16ª. The jaws 14ª, in the present instance, however, are not clamping jaws, but expanding jaws, that is, their outer ends are designed to fit in the pipe C. This dispenses with the use of a centering pin for the pipe, and further, enables pipe C. to be threaded on its inner end and thus these threads will not be bruised by the action of the clamping-jaws. The spring 19ª tends to hold the outer ends of the jaws 14ª inwardly when the collar 6ᵇ is moved inwardly on its shaft. The operation of this clutch for the larger pipe C. is substantially the same in all respects as that described with respect to the smaller pipe except that the inner end of the pipe is gripped by outwardly expanding members instead of inwardly contracting members. Base A. and its pipe C. are supported upon a sliding bed-plate 21ª having a head-piece with a seat for the base casting, and cross bar, etc., similar to the corresponding parts heretofore described.

I claim:

1. In a pipe assembling machine, a rotatably mounted shaft, one end of which shaft terminates in a centering pin adapted to enter a pipe, there being a head formed on said shaft adjacent to said centering pin, a member screw-seated on said threaded portion of the shaft, means for locking said member in position on said threaded portion, a pair of jaws pivotally mounted on said member, the outer ends of which jaws are adapted to engage the end of the pipe positioned on the centering pin, a spring connecting the rear portion of the jaws for moving the outer ends thereof away from each other, and a member mounted to rotate with and slide lengthwise upon the shaft for actuating said jaws to move the outer ends thereof toward each other into frictional engagement with the end of a pipe positioned on the centering pin.

2. In a pipe assembling machine, a rotatably mounted shaft the end of which terminates in a centering pin adapted to receive the end of a pipe, a pair of work engaging jaws adjustably mounted on said shaft which jaws are adapted to move radially toward and away from the centering pin on said shaft, a jaw actuating member mounted to rotate with and slide longitudinally of said shaft, means for positively moving the jaw actuating member toward and away from said jaws, and a work support arranged in front of said jaws and movable toward and away from the same.

3. In a pipe assembling machine the combination with a rotatably mounted shaft, and means associated therewith for frictionally engaging the end of a pipe, of a combined feed table and work support arranged in front of said shaft and movable toward and away from the same, said feed table and work support comprising a base plate, a head carried thereby, said head being provided with a recess adapted to receive a part of the work, and a notched bar on the base plate in front of the head, which notched bar is adapted to support the pipe which is acted upon by the frictional pipe engaging means.

In testimony whereof I hereunto affix my signature in the presence of two witnesses, this 15th day of May, 1916.

JOHN C. MOON.

Witnesses:
M. P. SMITH,
M. A. HANDEL.

Copies of this patent may be obtained for five cents each, by addressing the "Commissioner of Patents. Washington, D. C."